United States Patent
Newman et al.

(10) Patent No.: US 9,748,753 B2
(45) Date of Patent: Aug. 29, 2017

(54) INSULATING L BUSBAR COVERS AND RELATED SYSTEMS AND METHODS

(71) Applicant: Tyco Electronics Corporation, Berwyn, PA (US)

(72) Inventors: John Anthony Newman, Fuquay Varina, NC (US); Mahmoud K. Seraj, Apex, NC (US); Laura J. Hiller, Cary, NC (US); David E. Bowling, Fuquay Varina, NC (US)

(73) Assignee: TE Connectivity Corporation, Berwyn, PA (US)

( * ) Notice: Subject to any disclaimer, the term of this patent is extended or adjusted under 35 U.S.C. 154(b) by 16 days.

(21) Appl. No.: 14/741,800

(22) Filed: Jun. 17, 2015

(65) Prior Publication Data

US 2015/0371731 A1  Dec. 24, 2015

Related U.S. Application Data

(60) Provisional application No. 62/013,856, filed on Jun. 18, 2014.

(51) Int. Cl.
*H01B 3/18* (2006.01)
*H02G 5/06* (2006.01)
*H02G 3/04* (2006.01)
*H02G 3/06* (2006.01)

(52) U.S. Cl.
CPC .............. *H02G 5/06* (2013.01); *H02G 3/0487* (2013.01); *H02G 3/0608* (2013.01); *Y10T 29/49119* (2015.01)

(58) Field of Classification Search
CPC ........ H01B 7/0258; H01B 13/10; H02G 5/06; H02G 5/005; H02G 1/113
USPC ....... 174/110 R, 149 B, 137 R, 149 R, 72 B; 439/114; 361/637, 648, 675
See application file for complete search history.

(56) References Cited

U.S. PATENT DOCUMENTS

| 4,142,224 | A | * | 2/1979 | Wilson | H02B 1/21 174/133 B |
| 4,530,865 | A | * | 7/1985 | Sprenger | E04F 19/04 138/111 |
| 2010/0319958 | A1 | * | 12/2010 | Latimer | H02G 5/005 174/110 D |

FOREIGN PATENT DOCUMENTS

GB      2 089 585      6/1982

OTHER PUBLICATIONS

MIDSUN Group catalog, 43 pages, available as of filing date.

* cited by examiner

*Primary Examiner* — Steven T Sawyer
(74) *Attorney, Agent, or Firm* — Myers Bigel, P.A.

(57) ABSTRACT

An insulating cover for an L-shaped busbar includes first and second opposing longitudinal edge portions and a longitudinal groove between the first and second longitudinal edge portions. The cover is configured to wrap around the busbar in an installed position with the first and second longitudinal edge portions overlapping, with the second longitudinal edge portion adjacent and generally parallel to a leg of the busbar and with the first longitudinal edge portion in the longitudinal groove of the cover.

17 Claims, 8 Drawing Sheets

INSULATING L BUSBAR COVERS AND RELATED SYSTEMS AND METHODS

RELATED APPLICATION

This application claims priority from U.S. Provisional Application No. 62/013,856, filed Jun. 18, 2014, the disclosure of which is hereby incorporated herein in its entirety.

BACKGROUND

Insulating covers are used around conductive busbars to provide protection from contact by wildlife that may cause power outages.

SUMMARY

Some embodiments of the present invention are directed to an insulating cover for an elongate L-shaped busbar. The cover includes first and second opposing longitudinal edge portions and a longitudinal groove between the first and second longitudinal edge portions. The cover is configured to wrap circumferentially around the busbar in an installed position with the first and second longitudinal edge portions overlapping, with the second longitudinal edge portion adjacent and generally parallel to a leg of the busbar and with the first longitudinal edge portion in the longitudinal groove of the cover.

In some embodiments, the longitudinal groove is between a longitudinal ramp of the cover and the second longitudinal edge portion of the cover, and wherein the groove is configured to receive the first longitudinal edge portion of the cover to secure the cover to the busbar.

In some embodiments, in the installed position, the longitudinal groove is adjacent an inner corner of the busbar that is defined by two legs of the busbar.

In some embodiments, in the installed position, the cover completely surrounds the busbar.

In some embodiments, the cover includes an elongated region at one end of the cover, a flared region at the opposite end of the cover and a transition region between the elongated region and the flared region. The transition region increases the cross-sectional size of the cover from the elongated region to the flared region.

In some embodiments, the cover is a first cover and, with the first cover in the installed position, the flared region is sized and configured to overlap an end portion of the elongated region of a second, substantially identical cover that is also in the installed position.

The cover may be monolithic. The cover may be flexible and resilient.

In some embodiments, the cover is configured to provide audible and/or tactile feedback when the cover is wrapped around the busbar in the installed position.

Some other embodiments of the present invention are directed to a method. The method includes: providing an insulating cover comprising first and second longitudinal edge portions and a longitudinal groove between the first and second longitudinal edge portions; and wrapping the cover around an L-shaped busbar such that the second longitudinal edge portion is adjacent and generally parallel to a first leg of the busbar and the first longitudinal edge portion is in the longitudinal groove of the cover to secure the cover to the busbar.

In some embodiments, the method includes positioning the cover such that the groove is adjacent an inner corner of the busbar that is defined between two legs of the busbar.

In some embodiments, the cover includes a longitudinal ramp with the longitudinal groove between the longitudinal ramp and the second longitudinal edge portion of the cover. The method may include flexing the first longitudinal edge portion over the first leg of the busbar such that the first longitudinal edge portion is adjacent and/or rests on the ramp. The method may include flexing the first longitudinal edge portion over the ramp such that the first longitudinal edge portion is received in the groove. The method may include receiving audible and/or tactile feedback as the first longitudinal edge portion is received in the groove.

In some embodiments, the cover is a first cover, and the method includes wrapping a second cover around the L-shaped busbar such that a portion of the second cover overlaps the first cover. The first and second covers may each include an elongated region, a flared region and a transition region therebetween that raises the cover from the elongated region to the flared region, and the method may include wrapping the flared region of the second cover over the elongated region of the first cover.

Some other embodiments of the present invention are directed to an insulating cover system for an L-shaped busbar. The system includes first and second insulating covers. Each cover includes first and second opposing longitudinal edge portions and a longitudinal groove between the first and second longitudinal edge portions. Each cover includes an elongated region, a flared region and a transition region therebetween that outwardly expands the cover from the elongated region to the flared region. Each cover is configured to wrap around the busbar in an installed position with the first and second longitudinal edge portions overlapping, with the second longitudinal edge portion adjacent and generally parallel to a leg of the busbar and with the first longitudinal edge portion in the longitudinal groove of the cover. The first and second covers are configured to axially overlap with the flared region of one of the first and second covers wrapped around the elongated region of the other one of the first and second covers.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense expressly so defined herein.

The term "monolithic" means an object that is a single, unitary piece formed or composed of a material without joints or seams.

Embodiments of the invention are directed to covers for L-shaped or angle busbars. The busbar may form a part of electrical power transmission equipment or network. The busbar may be formed of exposed (bare) metal that may be subject to elements or wildlife. Personnel or wildlife may be exposed to the busbar (e.g., when the busbar is energized). Covers according to embodiments described herein provide flashover protection in a modular and/or wraparound design that can be installed relatively easily and quickly. Covers according to embodiments described herein may be installed without dismantling existing equipment.

An insulating cover 10 according to some embodiments of the invention is shown in a "rest" position in FIGS. 1 to 5. The cover 10 has an overall length L1 (FIG. 2) that may be between about 36 and 60 inches and, in some embodiments, is about 48 inches.

The cover 10 includes an elongated region 12, a flared region 14 and a transition region 16 between the elongated region 12 and the flared region 14. The elongated region has a length L2 that may be between about 30 and 54 inches and, in some embodiments, is about 43.25 inches. The flared region has a length L3 that may be between about 3 and 5 inches and, in some embodiments, is about 4 inches. The transition region has a length L4 that may be between about 0.5 and 2 inches and, in some embodiments, is about 0.75 inches.

It will be understood that the lengths L1, L2, L3 and/or L4 may vary for different applications. For example, the cover 10 may be cut to have shorter lengths L1 and L2 for certain applications.

Figure 1:
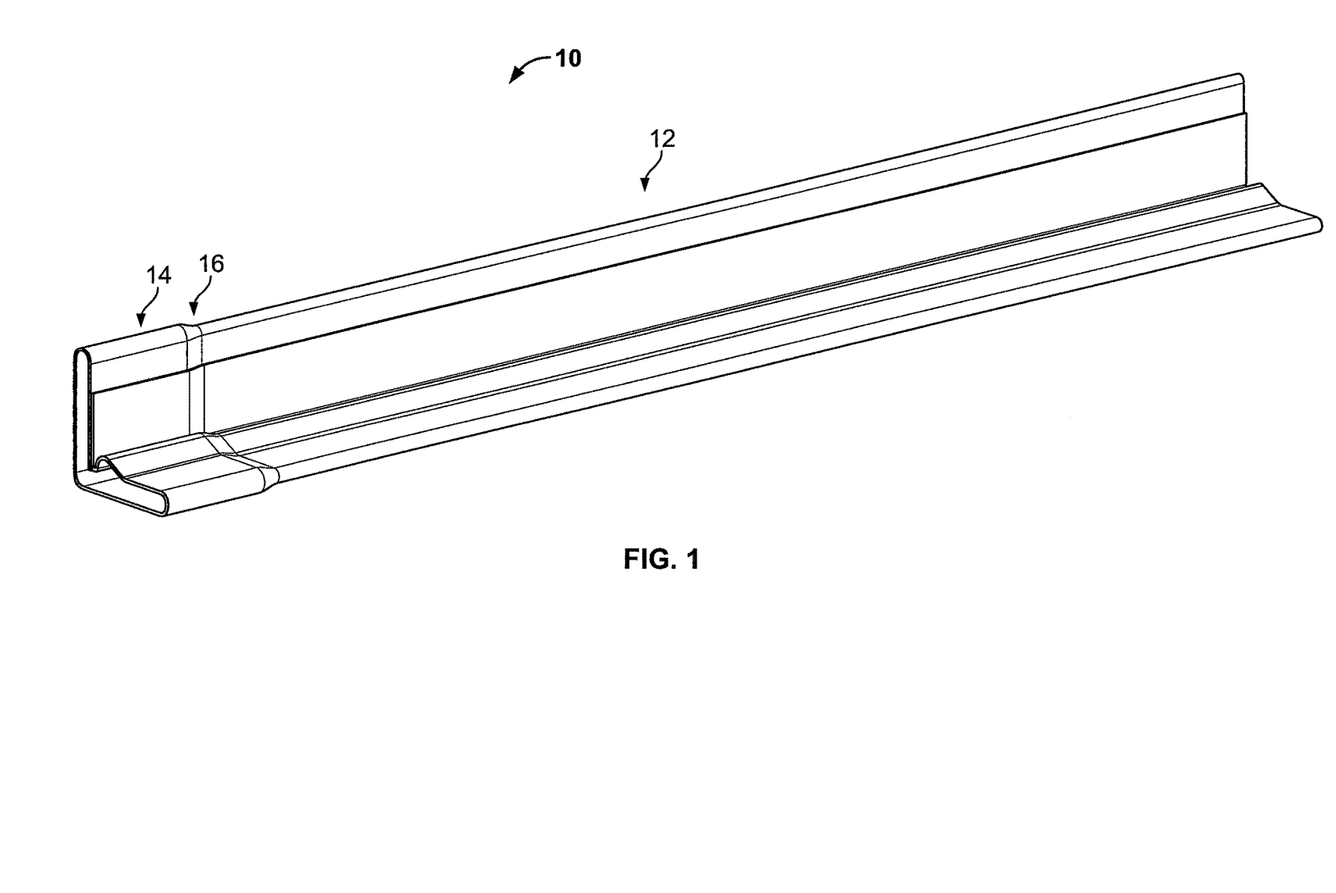
FIG. 1 is a perspective view of an insulating cover according to embodiments of the present invention.
Figure 2:
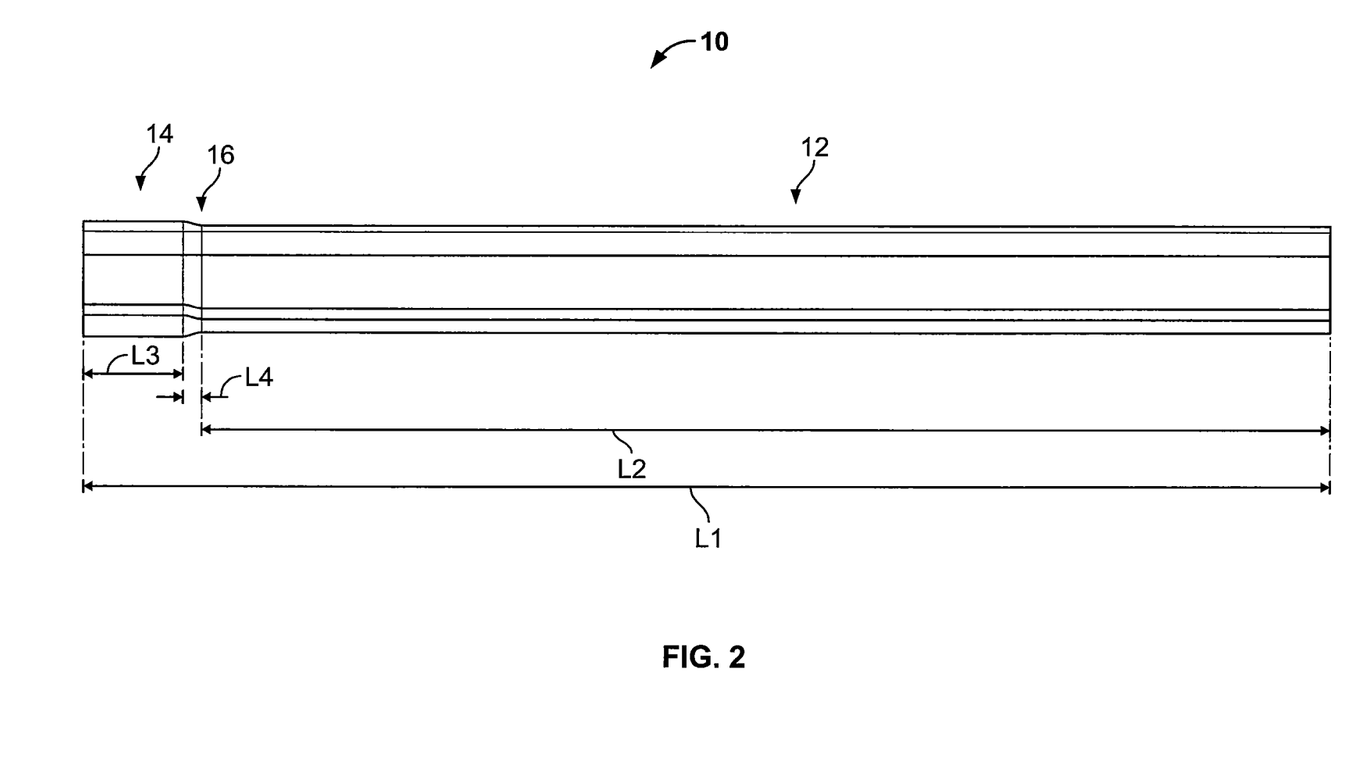
FIG. 2 is a front view of the cover of FIG. 1.
Figure 3:
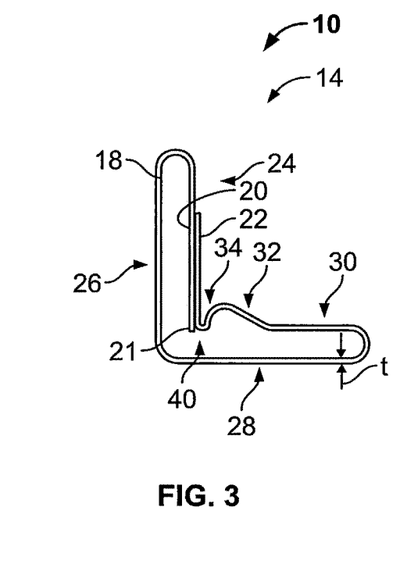
FIG. 3 is a cross-sectional view of a flared region of the cover of FIG. 1.
Figure 4:
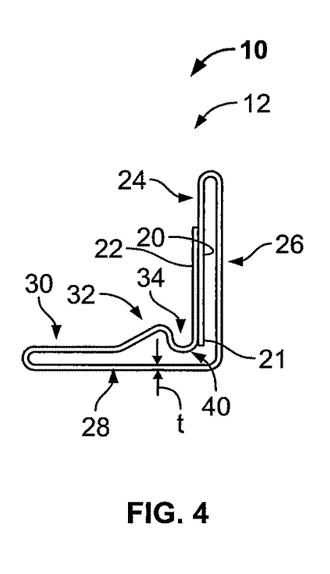
FIG. 4 is a cross-sectional view of an elongated region of the cover of FIG. 1.
Figure 5:
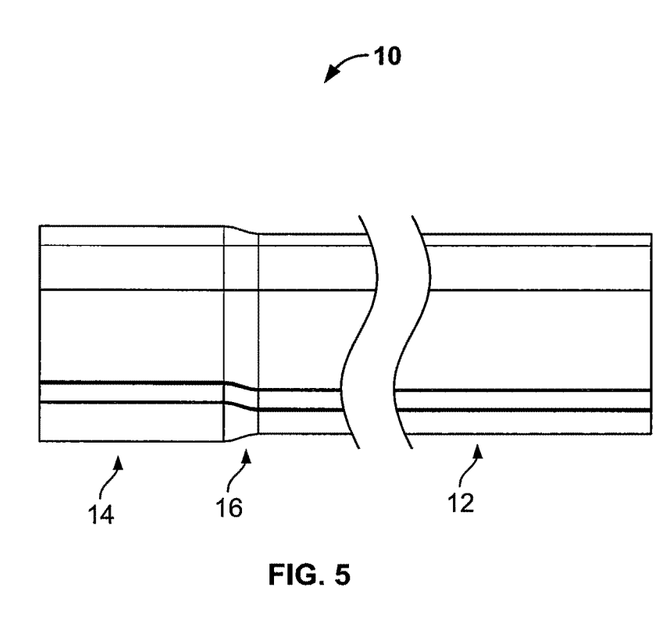
FIG. 5 is a fragmentary front view of the cover of FIG. 1.

The cover 10 has an electrical insulation layer 18 (FIGS. 3 and 4). The insulation layer 18 is formed of a suitable electrically insulative material such as a polymeric material. The insulation layer 18 may include additives for increased resistance to adverse environmental conditions. The insulation layer 18 is typically flexible and resilient. The insulation layer 18 may have a constant or substantially uniform layer thickness t. The layer thickness t may be between about 0.05 and 0.25 inches and, in some embodiments, is about 0.125 inches.

The cover 10 may have a Young's modulus of between about 0.1 and 0.8 GPa and, in some embodiments, between about 0.1 and 0.45 GPa.

The cover 10 may begin as a flat sheet and then formed to have a generally L-shaped cross section such that first and second opposing longitudinal edge portions 20, 22 overlap (FIGS. 3 and 4). In some embodiments, the first and second longitudinal edge portions 20, 22 overlap by about 2 to 3 inches.

Referring to FIGS. 3 and 4, the overlapped longitudinal edge portions 20, 22 form a portion of a first leg inner portion 24 of the cover 10. The cover 10 also includes a first leg outer portion 26, a second leg outer portion 28 and a second leg inner portion 30.

The second leg inner portion 30 includes a longitudinally-extending ramp 32 and a longitudinally-extending groove or valley 34 between the first leg inner portion 24 and the ramp 32. As described in more detail below, the groove 34 is configured to receive the first longitudinal edge portion 20 in an "installed" position.

The first leg inner portion 24, the first leg outer portion 26, the second leg outer portion 28 and the second leg inner portion 30 define a channel 40. The transition region 16 (FIG. 5) increases the cross-sectional area or size of the channel 40 from the elongated region 12 to the flared region 14. As described in more detail below, the channel 40 at the flared region 14 is sized such that the flared region 14 of a cover 10 can wrap around the elongated region 12 of another cover 10 in an installed position.

Put another way, the cross-sectional size of the channel 40 at the flared region 14 may be offset by about one to two layer thicknesses t from the cross-sectional size of the channel 40 at the elongated region 12. The transition region 16 serves to raise the cover 10 from the elongated region 12 to the flared region 14. These shapes allow for multiple covers 10 to be linked together end-to-end with an overlap corresponding to the length of the flared region 14 (e.g., about 4 inches).

Figure 6:
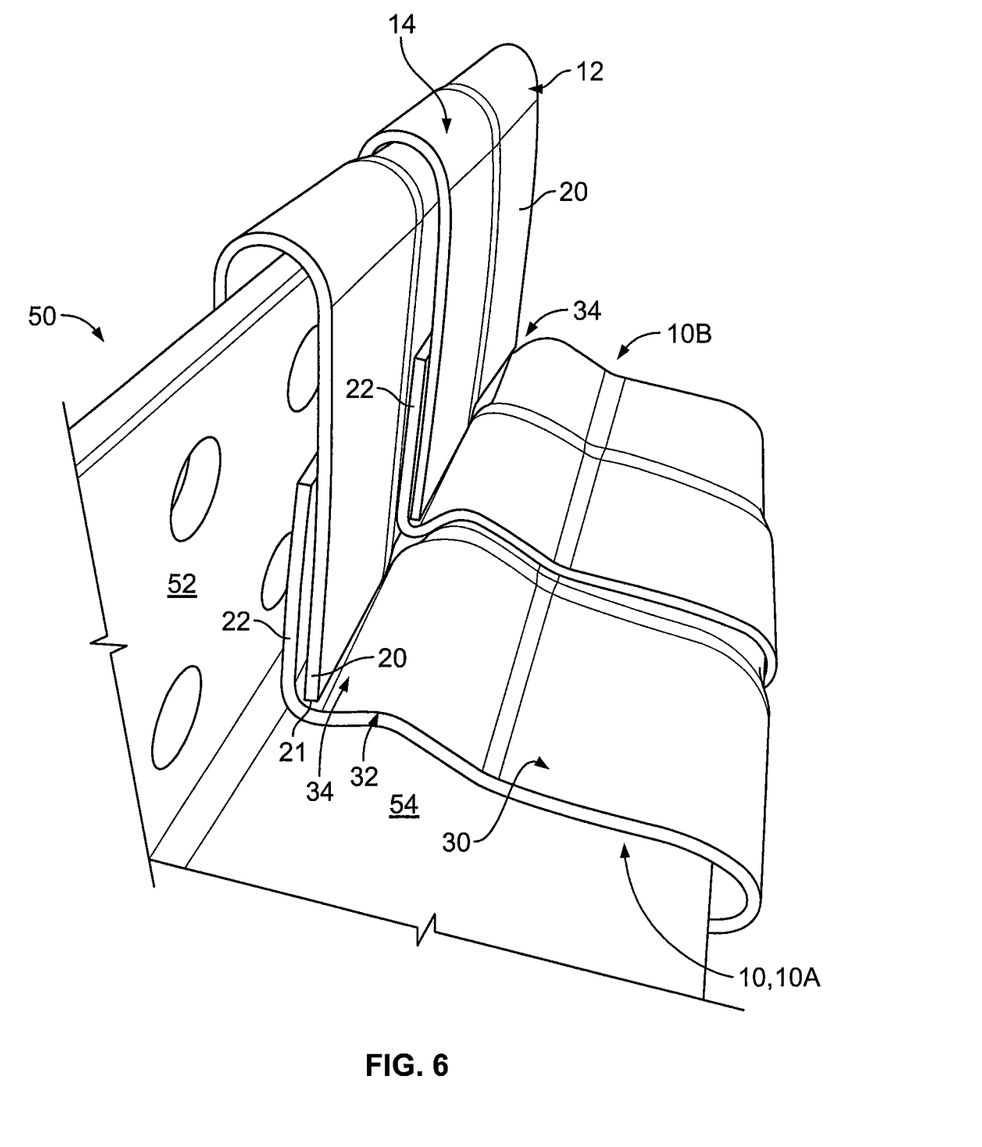
FIG. 6 is a perspective view of portions of two of the covers of FIG. 1 installed around an L-shaped busbar.

The cover 10 is shown in an installed position in FIG. 6. The cover 10 may be installed as follows. The overlapped longitudinal edge portions 20, 22 are separated from the rest position shown in FIGS. 1 to 5. The cover 10 is then wrapped around an L-shaped busbar 50. The second longitudinal edge portion 22 is placed adjacent or against a first leg 52 of the busbar 50. The cover 10 is then wrapped around a second leg 54 of the busbar 50 and then the first leg 52 of the busbar 50. The first longitudinal edge portion 20 is urged across and over the ramp 32 and into the groove 34 of the cover 10.

In the installed position, the first longitudinal edge portion 20 (or a first longitudinal edge 21) may be secured or locked in the groove 34. When the first longitudinal edge portion 20 is received in the groove 34, the first longitudinal edge portion 20 and/or the groove 34 may provide audible and/or tactile feedback indicating that the cover 10 has been properly installed. In addition, because the longitudinal edge portions 20, 22 are reversed from the rest position to the installed position, a compression force may be exerted by the cover 10 on the busbar, thereby giving the cover additional stability.

Figure 7:
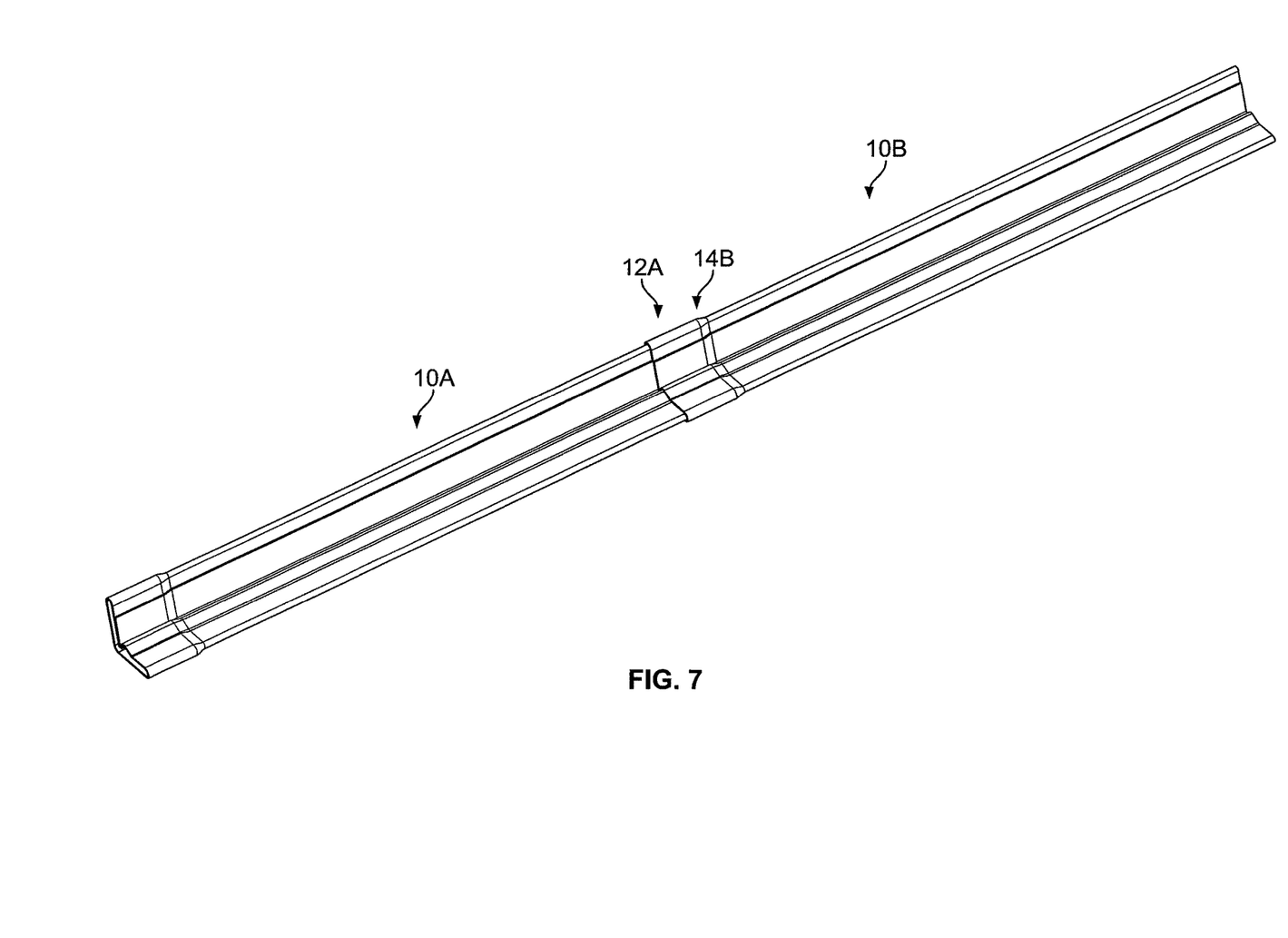
FIG. 7 is a perspective view of one of the covers of FIG. 1 overlapping another one of the covers of FIG. 1 in an installed configuration.
Figure 8:
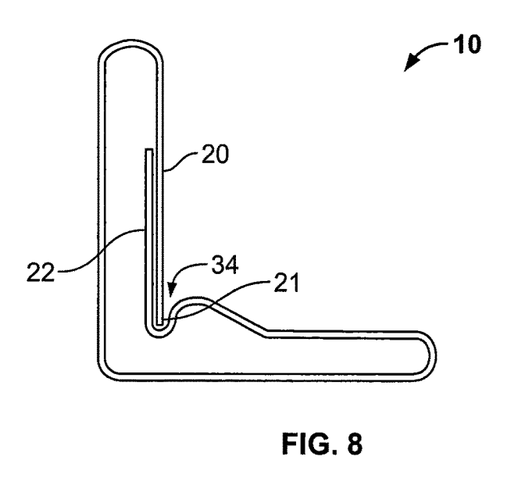
FIGS. 8-15 illustrate methods for installing one or more of the covers of FIG. 1 on an L-shaped busbar according to some embodiments of the present invention.

As discussed above, multiple covers may be chained or linked together. Referring to FIGS. 6 and 7, the cover 10A may be first installed on the busbar as described above. A second cover 10B may be then installed with a portion of the cover 10B overlapping the cover 10A. Referring to FIG. 7, the cover 10B is installed with the flared region 14B overlapping a portion of the elongated region 12A of the cover 10A. As described above in reference to FIGS. 3 and 4, a channel 40 at the flared region 14 of one cover 10 is sized such that a portion of the elongated region 12 of another cover 10 can be received therein.

Referring to FIG. 6, the second cover 10B may be installed as follows. The second longitudinal edge portion 22 of the flared region 14 of the second cover 10B is placed adjacent or against the first longitudinal edge 20 of the first cover 10A and the second longitudinal edge 22 of the elongated region 12 of the second cover 10B is placed adjacent or against the first leg 52 of the busbar 50. The second cover 10B is then wrapped around the first cover 10A and the busbar 50 in the manner described above and the first longitudinal edge portion 20 is urged across and over the ramp 32 and into the groove 34 of the second cover 10B.

FIGS. 8-15 illustrate methods for installing one or more of the covers 10 on an L-shaped busbar 50. The cover 10 may be packaged and/or received by a user in the configuration shown in FIG. 8, which generally corresponds to the installed position described above. The first and second longitudinal edge portions 20, 22 overlap and the longitudinal edge portion 20 (or the longitudinal edge 21) is in the groove or pocket 34.

Figure 9:
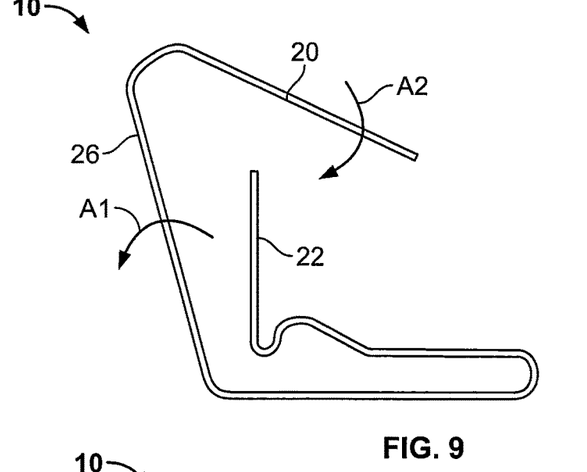
Figure 10:
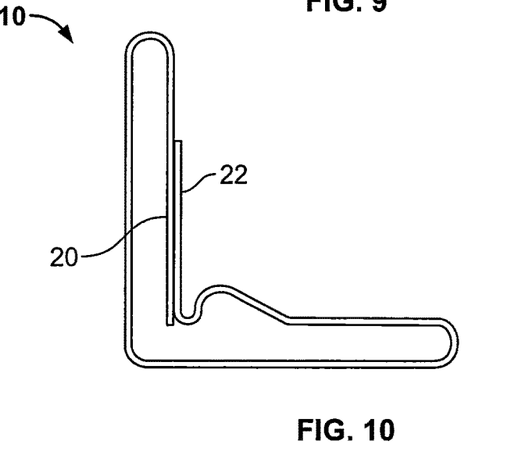

The overlap of the cover 10 may be reversed as illustrated in FIGS. 9 and 10. Referring to FIG. 9, the user may flex or urge the first leg outer portion 26 away from the second longitudinal edge portion 22 (arrow A1). While maintaining the first leg outer portion 26 in the flexed position, the user may push or urge the first longitudinal edge portion 20 inside of the second longitudinal edge portion 22 (arrow A2) such that the cover 10 assumes the configuration shown in FIG. 10. This configuration generally corresponds to the rest position described above. The overlap of the first and second longitudinal edges 20, 22 has been reversed from the configuration shown in FIG. 8.

Figure 11:
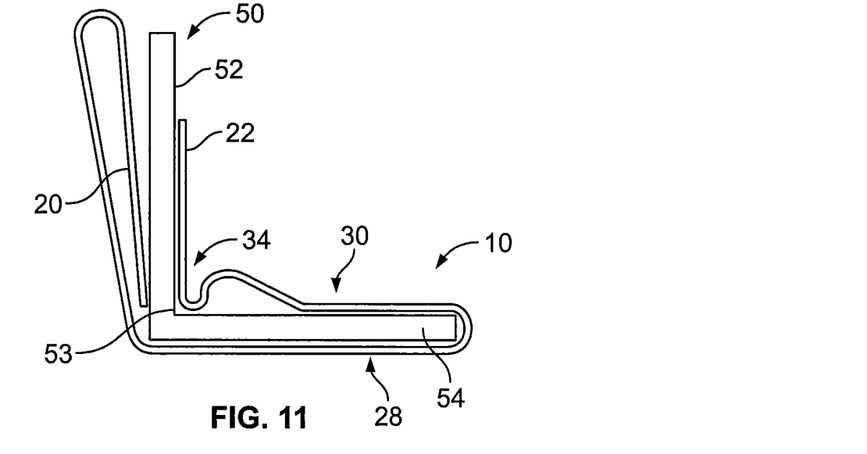

The cover 10 may be positioned on the L-shaped busbar 50 as illustrated in FIG. 11. The longitudinal groove 34 may be positioned at an inside corner 53 defined by the first and second legs 52, 54 of the busbar 50. The cover second leg inner portion 30 is above the busbar second leg 54 and the cover second leg outer portion 28 is below the busbar second leg 54. The busbar first leg 52 is between the first and second longitudinal edges 20, 22 of the cover 10.

Figure 12:
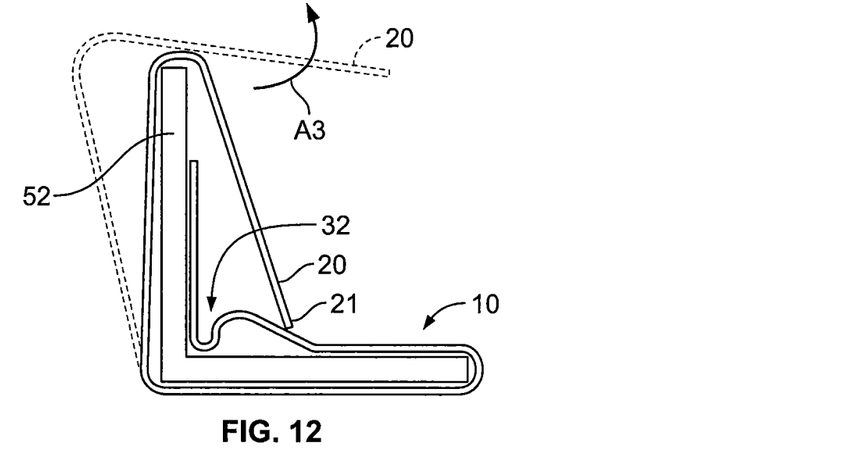

The first longitudinal edge portion 20 of the cover 10 may be repositioned as illustrated in FIG. 12. The user may lift or urge the first longitudinal edge portion 20 over the first leg 52 of the busbar 50 (arrow A3) such that the first longitudinal edge portion 20 (or first longitudinal edge 21) rests on the ramp 32.

Figure 13:
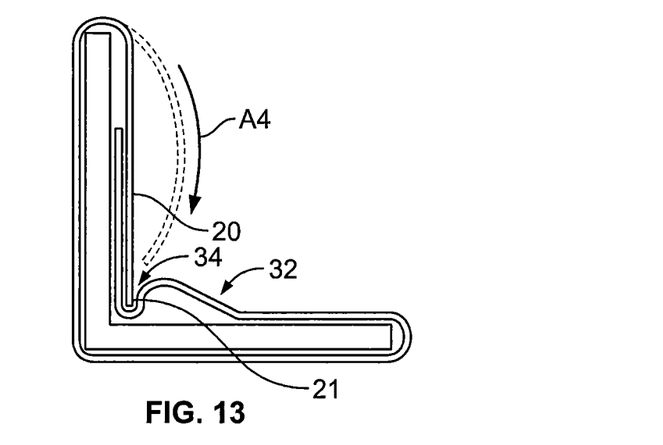

The first longitudinal edge portion 20 of the cover 10 may be received in the groove 34 as illustrated in FIG. 13. At one end of the cover 10, the user may flex or urge the first longitudinal edge 20 (arrow A4) such that the first longitudinal edge portion 20 (or the first longitudinal edge 21) is received or seated in the groove 34.

Figure 14:
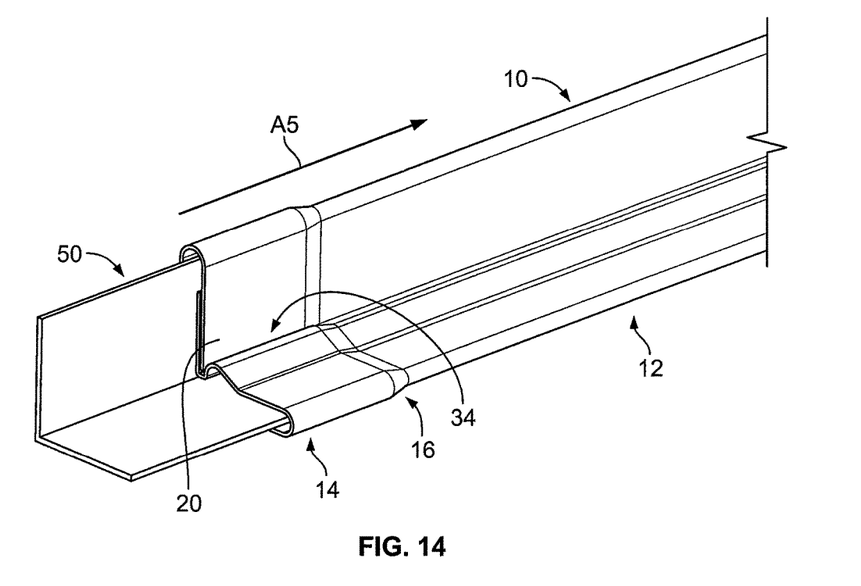

Referring to FIG. 14, the first longitudinal edge portion 20 may be progressively received in the groove 34 along the length of the cover 10 as indicated by the arrow A5. For example, and as illustrated, the first longitudinal portion 20 may be first received in the groove 34 at the flared region 14 of the cover and then progressively received in the transition region 16 and then the elongated region 12 along the length of the cover 20. In some embodiments, the user can feel and/or hear the cover 10 as it is locked into place (i.e., as the first longitudinal edge portion 20 is received in the groove 34).

Figure 15:
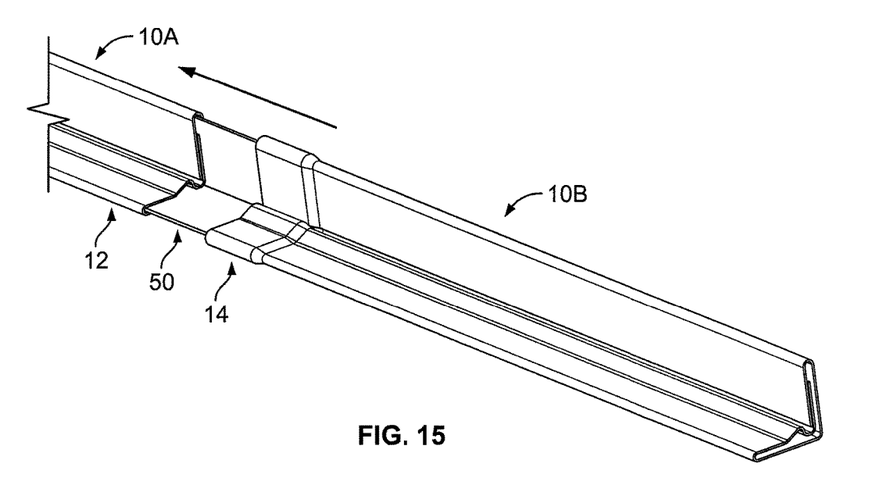

The cover 10 that has been installed on the busbar 50 as described above can be mated with another cover 10. Referring to FIG. 15, the cover 10A may be installed on the busbar 50 as described above. The cover 10B may then be installed by first overlapping the flared region 14 of the cover 10B over the end of the elongated region 12 of the cover 10A and then repeating the steps described above in reference to FIGS. 8-14.

The cover 10 may be formed in a variety of ways including, but not limited to extruding, vacuum forming, heat forming and bending, and injection molding. Other ways of forming the cover will be apparent to those skilled in the art.

The covers described herein can facilitate easier and faster installation of insulating material around busbars than tapes, heat shrink tubing and heat shrink tapes, for example. The cover does not require the use of additional fasteners. Further, no additional parts (e.g., fasteners) are needed to chain more than one cover together.

The one-piece or all-in-one cover designs described herein differ from known covers that use fasteners to attach the cover to the busbar and/or that use fasteners to join more than one cover together. The cover is flexible to allow rapid installation by wrapping the cover around the busbar such as in the manner described above. The cover employs the ramp and groove as described above to lock the cover to help prevent an animal or adverse weather conditions from loosening and/or uninstalling the cover.

The flexible covers according to embodiments of the invention may fit differently sized busbars while still providing suitable electrical insulation. The cover may be cut to length and/or multiple covers may be linked to cover a variety of busbar lengths.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. An insulating cover for an L-shaped busbar, the cover comprising: first and second opposing longitudinal edge portions; and a longitudinal groove between the first and second longitudinal edge portions; wherein the cover is configured to wrap around the L-shaped busbar in an installed position with the first and second longitudinal edge portions overlapping, with the second longitudinal edge portion adjacent and generally parallel to a leg of the L-shaped busbar and with the first longitudinal edge portion in the longitudinal groove of the cover;
    wherein, in the installed position: the cover completely surrounds the L-shaped busbar; a first leg inner portion of the cover including the first and second longitudinal edge portions is adjacent a first leg of the L-shaped busbar; a first leg outer portion of the cover is adjacent the first leg of the L-shaped busbar; a second leg outer portion of the cover is adjacent a second leg of the L-shaped busbar; a second leg inner portion of the cover is adjacent the second leg of the L-shaped busbar.

2. The cover of claim 1 wherein the longitudinal groove is between a longitudinal ramp of the cover and the second longitudinal edge portion of the cover, wherein the longitudinal ramp is between the first and second longitudinal edge portions, and wherein, in the installed position, the groove is configured to receive the first longitudinal edge portion of the cover to secure the cover to the L-shaped busbar.

3. The cover of claim 1 wherein, in the installed position, the longitudinal groove is adjacent an inner corner of the L-shaped busbar that is defined by the first and second legs of the L-shaped busbar.

4. The cover of claim 1 wherein the cover comprises:
an elongated region at one end of the cover;
a flared region at the opposite end of the cover; and
a transition region between the elongated region and the flared region, wherein the transition region increases the cross-sectional size of the cover from the elongated region to the flared region.

5. The cover of claim 4 wherein the cover is a first cover, and wherein, with the first cover in the installed position, the flared region is sized and configured to overlap an end portion of the elongated region of a second, substantially identical cover that is also in the installed position.

6. The cover of claim 1 wherein the cover is monolithic.

7. The cover of claim 1 wherein the cover is flexible and resilient.

8. The cover of claim 1 wherein the cover is configured to provide audible and/or tactile feedback when the cover is wrapped around the L-shaped busbar in the installed position.

9. A method comprising: providing an insulating cover comprising first and second longitudinal edge portions and a longitudinal groove between the first and second longitudinal edge portions; and wrapping the cover around an L-shaped busbar in an installed position such that the second longitudinal edge portion is adjacent and generally parallel to a first leg of the L-shaped busbar and the first longitudinal edge portion is in the longitudinal groove of the cover to secure the cover to the L-shaped busbar; wherein, in the installed position:
    the cover completely surrounds the L-shaped busbar; a first leg inner portion of the cover including the first and second longitudinal edge portions is adjacent the first leg of the L-shaped busbar; a first leg outer portion of the cover is adjacent the first leg of the L-shaped busbar; a second leg outer portion of the cover is adjacent a second leg of the L-shaped busbar; a second leg inner portion of the cover is adjacent the second leg of the L-shaped busbar.

10. The method of claim 9 comprising positioning the cover such that the groove is adjacent an inner corner of the L-shaped busbar that is defined between the first and second legs of the L-shaped busbar.

11. The method of claim 9 wherein the cover comprises a longitudinal ramp with the longitudinal groove between the longitudinal ramp and the second longitudinal edge portion of the cover.

12. The method of claim 11 comprising flexing the first longitudinal edge portion over the first leg of the L-shaped busbar such that the first longitudinal edge portion is adjacent and/or rests on the ramp.

13. The method of claim 12 comprising flexing the first longitudinal edge portion over the ramp such that the first longitudinal edge portion is received in the groove.

14. The method of claim 13 comprising receiving audible and/or tactile feedback as the first longitudinal edge portion is received in the groove.

15. The method of claim 9 wherein the cover is a first cover, the method further comprising wrapping a second cover around the L-shaped busbar such that a portion of the second cover overlaps the first cover.

16. The method of claim 15 wherein the first and second covers each include an elongated region, a flared region and a transition region therebetween that raises the cover from the elongated region to the flared region, the method comprising wrapping the flared region of the second cover over the elongated region of the first cover.

17. An insulating cover system for an L-shaped busbar, the system comprising:
    first and second insulating covers, each cover comprising:
        first and second opposing longitudinal edge portions;
        a longitudinal groove between the first and second longitudinal edge portions;
        an elongated region, a flared region and a transition region therebetween that outwardly expands the cover from the elongated region to the flared region;
    wherein each cover is configured to wrap around the L-shaped busbar in an installed position with the first and second longitudinal edge portions overlapping, with the second longitudinal edge portion adjacent and generally parallel to a leg of the L-shaped busbar and with the first longitudinal edge portion in the longitudinal groove of the cover;
    wherein the first and second covers are configured to overlap with the flared region of one of the first and second covers wrapped around the elongated region of the other one of the first and second covers.

\* \* \* \* \*